Feb 2, 1971 — L. FINE — 3,559,260

DETACHABLE CUTTING INSERTS

Filed March 10, 1969

INVENTOR
Lionel Fine
BY
ATTORNEYS 3,559,260
DETACHABLE CUTTING INSERTS
Lionel Fine, Coventry, England, assignor to
Wickman Wimet Limited, Coventry, England
Filed Mar. 10, 1969, Ser. No. 805,659
Claims priority, application Great Britain, Mar. 13, 1968,
12,141/68
Int. Cl. B26d 1/00
U.S. Cl. 29—96                                    3 Claims

ABSTRACT OF THE DISCLOSURE

A machine tool cutting insert comprising a polygonal body having on at least one face a continuous land extending around its marginal edges, and a co-planar central plateau having sides opposite sides of the body characterised in that the sides of the plateau are convex so that the intervening groove formed between the plateau and the land widens from points midway between the corners of the body towards the corners.

---

This invention relates to detachable cutting inserts.

A problem which is frequently experienced in cutting metal is controlling the swarf which is produced. It is usual to provide a chip breaker which constitutes an abutment or groove which either breaks the swarf into small pieces, or causes the swarf to coil so that when the coil reaches a predetermined size it breaks naturally. However, even if the swarf is coiled in this way, it tends in certain circumstances to foul the cutting insert tool or workpiece, which clearly is undesirable. The present invention relates to a form of detachable cutting insert which has been found in practice to give more satisfactory results in a wide range of operations.

A cutting insert according to the invention comprises a body having on at least one face thereof a plateau, the plateau being bounded by at least one side which is adjacent to a cutting edge of the insert, said side of the plateau being convex and defining with the adjacent cutting edge of the insert, a groove which assists in the controlled removal of swarf in use.

Figure 1:
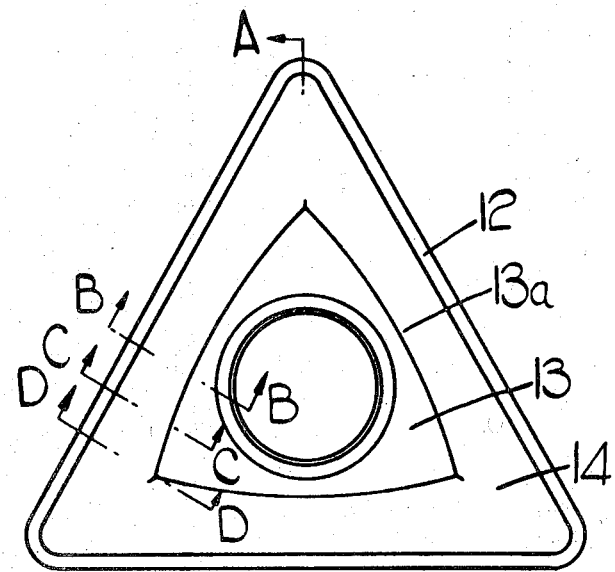
FIG. 1 is a plan view of an example of the invention.
Figure 2:
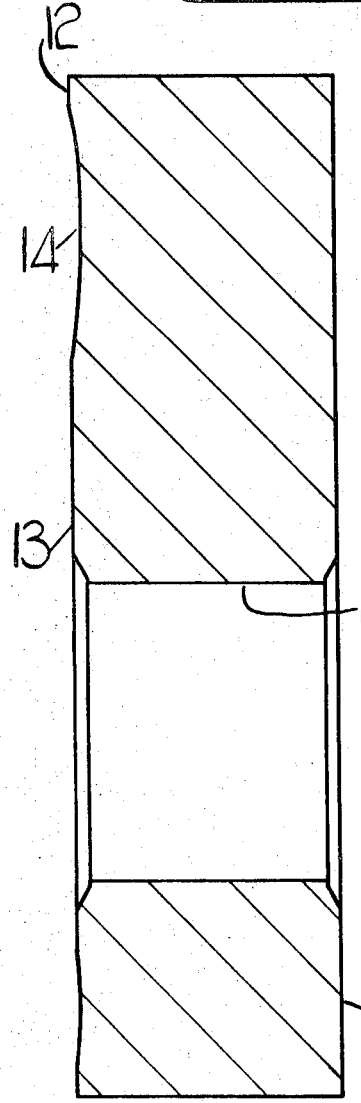
FIG. 2 is a section on the line A—A of FIG. 1.
Figure 3:
Figure 4:
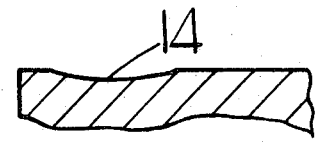
Figure 5:

FIGS. 3, 4 and 5 respectively are sections on the lines B—B, C—C, and D—D of FIG. 1 drawn to an enlarged scale.

Referring to the drawings the insert comprises a body formed from tungsten carbide or other sintered hard metal and which is of generally triangular form. The lower face 10 of the body is flat and is intended to be clamped against a flat surface of a carrier by means of a clamping pin passing through a hole 11 at the middle of the insert.

The upper face of the insert has a continuous land 12 of constant width extending around its three marginal edges, and a central substantially triangular plateau 13 which is co-planar with the land 12. The land 12 and plateau 13 are separated by a continuous groove 14 defined between the inner edges of the land 12 and the three sides 13a of the plateau 13. The three sides 13a are opposite the three sides of the insert. However, whilst the three sides of the insert are straight, the three sides 13a of the plateau are convex. Thus the width of the groove 14 varies, and has its narrowest points midway between the corners of the insert and its widest points at the corners. The groove conveniently is formed with varying radii and varies in depth from shallowest points midway between the corners.

In use, due to the fact that the groove 14 (usually termed a chip-breaking groove) decreases in width and depth from the corners, the chips of metal being cut from a work-piece will usually be caused to curl into a helical coil flowing away from the corner of the insert which is operating on the workpiece tending to leave both the cutting edge and workpiece surface clear. This feature has been found to be generally more satisfactory in a wide variety of operations, and has shown advantages in most operations over constructions wherein the plateau has concave, or straight sides.

If desired the face 10 of the insert would be formed similarly to the upper face to render the insert reversible. It will be understood that the insert could be of other polygonal shapes without departing from the scope of the invention.

Having thus described my invention what I claim as new and desire to secure by Letters Patent is:

1. A cutting insert comprising a polygonal body having, on at least one face, a continuous land extending around its marginal edges, and a central plateau having sides opposite the edges of the body, the sides of the plateau being convex, and a chip breaker groove formed between the plateau and the land, the width of the groove increasing from points midway between the corners of the body towards the corners.

2. A cutting insert as claimed in claim 1 in which the land is of constant width.

3. A cutting insert as claimed in claim 1 in which the depth of the groove varies from deepest points at the corners of the body to shallowest points midway between the corners.

References Cited

UNITED STATES PATENTS

| | | | |
|---|---|---|---|
| 3,279,034 | 10/1966 | Kaiser | 29—95 |
| 3,279,035 | 10/1966 | Johnson | 29—95 |
| 3,381,349 | 5/1968 | Newcomer | 29—105 |
| 3,383,748 | 5/1968 | Galimberti et al. | 29—95 |
| 3,395,434 | 8/1968 | Wirfelt | 29—95 |
| 3,137,917 | 6/1964 | Dowd | 29—105 |

HARRISON L. HINSON, Primary Examiner